July 16, 1963 L. L. WEISGLASS 3,097,563
EXPOSURE CONTROL FOR COLOR PRINTS
Filed April 27, 1960 2 Sheets-Sheet 1
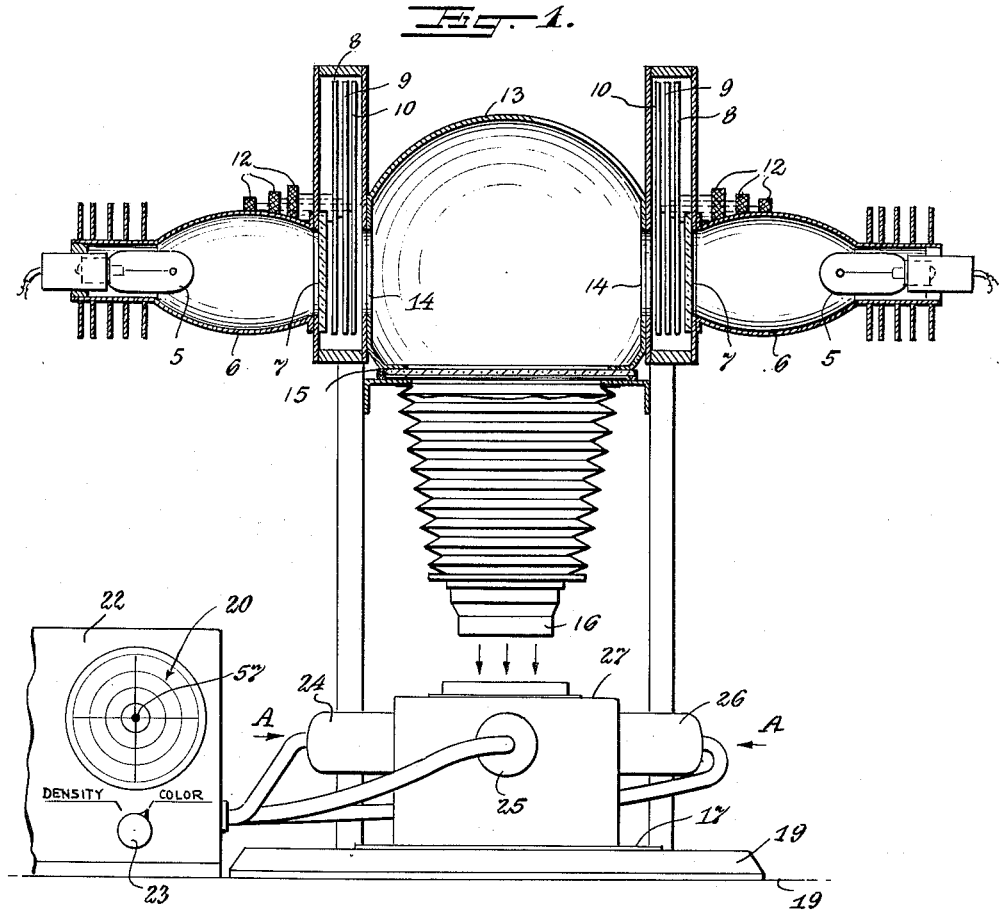
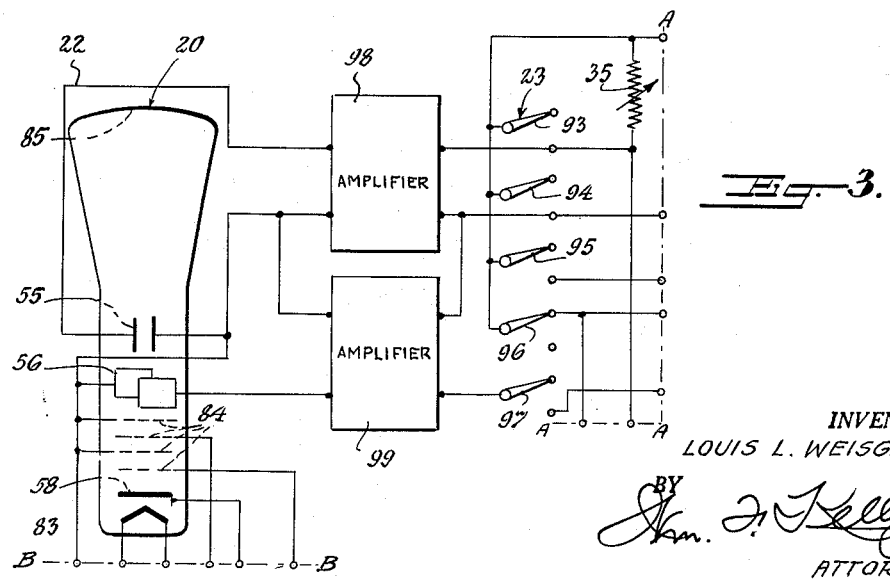
INVENTOR.
LOUIS L. WEISGLASS
BY
ATTORNEY.

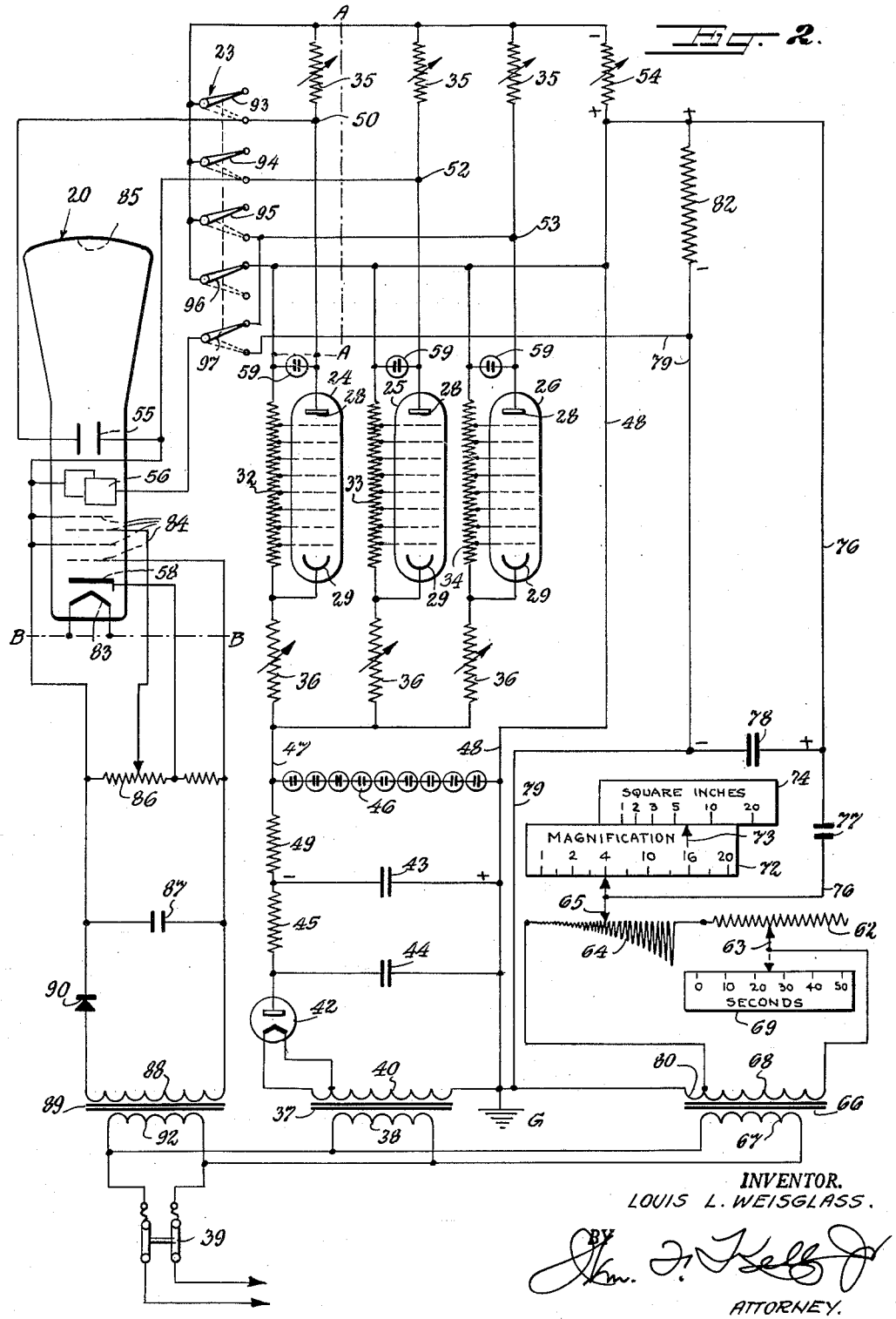

3,097,563
EXPOSURE CONTROL FOR COLOR PRINTS

Louis L. Weisglass, New York, N.Y., assignor to Simmon Brothers, Inc., Long Island City, N.Y., a corporation of New York
Filed Apr. 27, 1960, Ser. No. 24,946
12 Claims. (Cl. 88—24)

The present invention relates to an exposure control device and more particularly to such a device for use with photographic enlargers especially adapted to make enlarged color prints from a transparency.

In the making of color prints of desired color rendition from film transparencies there are several primary requisites, the most important of which are color balance and proper overall density. Various devices are known to the are for controlling the enlarger so as to produce the proper color balance and also the proper overall density but heretofore such devices have been separate and distinct in their respective operations even though each may be connected at the same time to the enlarger for controlling the latter for the purpose of producing an enlarged color print of desired rendition. These previously known arrangements are accordingly somewhat expensive in initial cost and with the relatively large number of parts subject to wear and other hazards of use their maintenance can likewise entail appreciable expense to the user.

It is accordingly an object of the present invention to provide an exposure control device for photographic enlargers which is operable to cause the enlarger to produce color prints of preselected desired color balance and overall density.

Another object of the present invention is the provision of a unitary exposure control device for photographic enlargers which is selectively operable to alternately cause the enlarger to be preset to produce color prints of a desired color balance and a desired overall density.

A further object of the present invention is the provision of a unitary exposure control device for photographic enlargers wherein the device is first selectively operable to cause the enlarger to be preset to produce color prints of a desired color balance and then by operation of a master switch such control device is then selectively operable to cause the setting of said photographic enlarger to cause it to produce color prints of a desired overall density.

Still further objects of the present invention will become obvious to those skilled in the art by reference to the accompanying drawings wherein:

FIGURE 1 is an elevational view of a photographic enlarger with which the exposure control device of the present invention may be used.

FIG. 2 is a schematic diagram of the electrical circuitry forming the essential part of the exposure control device of the present invention, and FIG. 3 is a schematic diagram of a slight modification which the exposure control device of the present invention may take.

Referring now to the drawings in detail, the enlarger shown in FIG. 1 may be of any well known type, such for example as that shown in U.S. Patent No. 2,306,666 granted December 29, 1942, to Alfred Simmon and owned by the same assignee as the present invention. Preferably, however, and as shown in FIG. 1, such enlarger is of the type disclosed and claimed in the copending application of Alfred Simmon, Serial No. 792,152, filed February 9, 1959, now U.S. Patent No. 3,028,483, issued April 3, 1962, and similarly to therein shown and described, although such enlarger will hereinafter be referred to specifically as being presettable to produce proper color balance and overall density of only three of the primary colors, it is to be understood that this is illustrative only and that the control device of the present invention is equally operable with photographic enlargers where correction is desired for an even greater or lesser number of primary colors.

Referring now more specifically to FIG. 1, the photographic enlarger as therein shown comprises one or more incandescent lamps 5 surrounded by specular light-collecting reflectors 6, whereby a very high percentage of the emitted light is caused to pass through an aperture 7 in front of which a number of color filters 8, 9 and 10 are arranged. These filters are in colors complementary to the primary colors of the system, which is herein assumed to be red, green and blue, so that such filters would hence be cyan, magenta and yellow, respectively. Each filter is herein shown with a knurled control knob 12 for the purpose of rotating each respective filter 8, 9 and 10 to dispose a clear segment or the greater colored area thereof directly in the path of the light beam emerging through the aperture 7 although in the commercial embodiment of the photographic enlarger, and as shown and described in the aforesaid copending application, Serial No. 792,152, such filters are individually rotated as desired by operation of a shaded coil type reversible electric motor.

After emerging from the aperture 7 and passing through one of the filters 8, 9 or 10, the light beam from the lamps 5 enters a mixing chamber 13 through an aperture 14 coaxially disposed relative to the aperture 7. This mixing chamber 13, which constitutes substantially an integrating sphere, has a non-glossy, diffusely reflecting white interior, so that by repeated diffuse reflection the light is uniformly distributed over the entire area of a film transparency 15. Then by the usual bellows adjustment of the enlarging lens 16, an enlarged image of the film transparency 15 is projected on to a sheet of sensitized color paper 17 disposed on the base 18 of the enlarger assembly which itself may rest upon a table or other suitable support 19.

In order to produce color prints of desired color rendition two requirements must be met, namely, proper color balance and proper overall density. Although these requisites have long been recognized, and it is known that proper overall density can be achieved by the adjustment of the iris diaphragm of the enlarging lens, the adjustment of the exposure time of a suitable time switch, or both, and that desired color balance can be obtained by proper adjustment of the color filters, the difficulty heretofore has been in the operator actually knowing by proper indication just when he has achieved these various proper settings. A solution to this problem has been disclosed and claimed in the copending application of Alfred Simmon and Louis L. Weisglass, Serial No. 3,033, filed January 18, 1960, and assigned to the same assignee as the present invention. Although the exposure control apparatus as therein shown and described operates entirely satisfactory, it utilizes separate adjustable elements which are preset by the operator for predicting the achievement of proper color balance and overall density but only after the actual exposure can the operator then observe the degree of success.

In contradistinction to that shown in this latter mentioned copending application, the present invention employs a visual indicator as shown in FIG. 1, which may for example be a cathode ray tube 20, enclosed within a housing or the like 22 and with such housing being provided with a master switch 23 operable in one position to cause the indicator 20 to give a visual indication of the "color" balance setting of the exposure control device of the present invention, and operable in another position to cause such indicator 20 to produce a visual indication of the overall "density" setting of the device, to thus give the operator an accurate visual indication of the precise results that will be produced without resort to any empirical determination.

By reference now more particularly to FIG. 2, the circuitry of the exposure control device of the present invention as therein shown comprises three distinct sections which may be identified, respectively, as a light measuring circuit, a density predicting circuit and a balance indicating circuit.

The light measuring circuit comprises photosensitive devices of any suitable type although photomultiplier tubes 24, 25 and 26 are preferably employed. Such photomultiplier tubes are housed within a suitable colorimeter or distributing element 27 (FIG. 1), which may be of the type as disclosed for example in U.S. Patent No. 2,574,264, granted November 6, 1951, and hence it is believed unnecessary to herein describe such colorimeters in detail. Suffice it to say that this colorimeter 27 may comprise a small integrating sphere having an ingress and egress aperture so that the light beam emerging from the enlarger lens 16 passes through the element 27 on to the sheet of sensitized paper 17. In addition such sphere is customarily provided with three apertures through which light emerges in three horizontal directions and in front of which is placed one of the respective complementary color filters of cyan, magenta and yellow, with each filter in turn being in front of one of the photomultiplier tubes 24, 25 and 26 so that the latter intercept the colored light beam passing through each respective filter.

As seen in FIG. 2 each photomultiplier tube 24, 25 and 26 has its usual anode 28 and photosensitive cathode 29 and between which are disposed the customary intermediate dynodes. The anodes 28, cathode 29 and dynodes of each photomultiplier tube 24, 25 and 26 are connected respectively to corresponding points on voltage dividers 32, 33 and 34, so that the section connected to the anode 28 has approximately 100,000 ohms resistance and all other sections a resistance of approximately 40,000 ohms, with the voltage between adjacent dynodes ranging from approximately 70 volts to 100 volts. The anodes 28 of the respective photomultiplier tubes 24, 25 and 26 are connected through variable high ohmic resistors 35 to points almost at ground potential while the voltage dividers 32, 33 and 34 are each connected through a variable resistor 36 to one side of a high voltage supply source, as hereinafter described more in detail. By adjustment of its respective variable resistor 36, the voltage between adjacent dynodes of each photomultiplier tube can be regulated and hence the sensitivity of each photomultiplier tube 24, 25 and 26 is thus controlled.

Energy for the photomultiplier tubes is supplied from a source comprising a high voltage transformer 37 having its primary winding 38 connected through a main line switch 39 to a suitable source of the customary commercial potential. The transformer secondary winding 40, which produces approximately 1300 volts to ground G, is rectified by a rectifier tube 42 and fed into a filter comprising a pair of parallel connected capacitors 43 and 44 and a series connected resistor 45. Since photomultiplier tubes are extremely sensitive to impressed voltages it is essential in the interest of accuracy that such voltages be kept constant and independent of line voltage fluctuations and the like. Accordingly a voltage stabilizer is provided comprising a plurality of series connected gas tubes 46 bridged across the high voltage supply source conductors 47 and 48 and in series with a resistance element 49, and since the voltage across these gas tubes 46 is almost completely independent of the current passing through them, any voltage fluctuations will be absorbed in the resistance element 49, so that the voltage across the high voltage supply conductors 47 and 48 and hence supplied through the variable resistors 36 to the respective photomultiplier tubes 24, 25 and 26 will remain at a constant value entirely independent of all voltage fluctuations.

Consequently the light measuring circuit causes points 50, 52 and 53, to assume negative voltages with respect to ground which are proportional to the respective light intensities of the three primary colors of blue, green and red, since the photomultiplier tubes conduct in response to the light impinging thereon and emerging from the distributing element or colorimeter 27 (FIG. 1). The points 50, 52 and 53 are connected through one of the respective variable resistors 35 to the high voltage supply conductor 48 which itself include a series connected adjustable line resistor 54 and hence in series with each one of the variable resistors 35. It will accordingly be apparent that while the three photomultiplier tubes 24, 25 and 26, when exposed to the light of the respective primary colors emerging from the colorimeter 27 cause current to flow through the three respective variable resistors 35 and thereby build up voltages representing the respective intensities of such primary colors, all three photomultiplier tube currents pass through adjustable line resistor 54 and hence build up a voltage representative of the total light intensity passing the lens 16 of the photographic enlarger.

It will also be noted from FIG. 2 that the points 50 and 52 and 52 and 53 are connected respectively to the vertical deflection plates 55 and horizontal deflection plates 56 of the cathode ray tube 20. As is customary such cathode ray tube 20 has a fluorescent screen on which a luminous spot 57 (FIG. 1) is produced by the impingement thereon of electrons flowing from its indirectly heated thermionic cathode 58. The end of this cathode ray tube 20 is provided with indicia which may take the form of a plurality of concentric circles of various diameters together with a vertical and horizontal line intersecting at the axis of the circles, as can be seen in FIG. 1. The distance of the luminous spot 57 from the center of the screen, or point of intersection of the vertical and horizontal lines, depends upon the voltages between the deflection plates 55 and 56. Inasmuch as the voltages between the points 50 and 52, and 52 and 53 is respectively proportional to the difference between blue and green light intensities, and green and red light intensities, it may happen that before the operator has a chance to balance these light intensities the voltage differences may sometimes become so large that the luminous spot 57 is deflected completely off of the fluorescent screen.

Should this occur the operator would ordinarily not immediately know in which direction to adjust the filters 8, 9 and 10 (FIG. 1) of the enlarger. In order to avoid this uncertainty a small neon lamp 59 is connected between the anode 28 of each photomultiplier tube and one end of its associated voltage divider and functions in a manner that may be likened to a safety valve. This is due to the fact that such neon lamps normally would conduct no current but as soon as the voltage between their respective electrodes exceeds a certain amount of the order of 75 volts, then such lamps 59 do become illuminated. This prevents the luminous spot 57 from being deflected to such an extent that it completely leaves the face of the screen. Moreover, when the neon lamps 59 do become conductive they pass current somewhat intermittently so that flickering illumination ensues rather than continuous lighting of such lamps. At the same time the luminous spot 57 describes an erratic and unstable pattern over the screen which thus gives an unmistakable signal to the operator to reduce the light intensity by closing or "stopping down" the iris diaphragm of the enlarger lens 16.

In order to properly preset the enlarger so as to produce color prints of desired overall density the present invention incorporates a density predicting circuit for this purpose which can be adjusted by the operator to give the desired results with fidelity and precision. Such density control per se is disclosed and claimed in the copending application of Alfred Simmon and Louis L.

Weisglass, Serial No. 9,265 filed February 17, 1960, and assigned to the same assignee as the present invention. It is accordingly believed superfluous to describe such control in detail herein but only so much as necessary to an understanding of the present invention. Suffice it to say that the light intensity (by which is meant the intensity of the light flux passing the lens of the photographer printer or enlarger) required for a satisfactory print is proportional to the square of the magnification, proportional to the area of the negative or more precisely the area of the aperture of the negative holder, and substantially inversely proportional to the exposure time. The slight deviation from a strict inverse proportionality is due to the failure of the reciprocity law for sensitized materials since they vary somewhat from one supply to another.

Accordingly the density control arrangement as shown in FIG. 2, comprises a rheostat consisting of a resistor 62 engageable by a movable contact 63, and a potentiometer consisting of a resistor 64 having one of its ends connected to one end of resistor 62 and also engageable by a movable contact 65. An insulating transformer 66 having its primary winding 67 connected by the main line switch 39 to the commercial source of supply, produces a predetermined constant input voltage from its secondary winding 68 to the movable contact 63 and to one end of the resistor 64, and an output voltage is derived between the remaining end of resistor 64 and its movable contact 65. The movable contact 63 is mechanically connected to a mark or pointer that coacts with a stationary scale 69 which is calibrated in seconds denoting exposure times.

The voltage impressed upon resistor 64 is inversely proportional to its total resistance plus the resistance of that part of resistor 62 connected by the pointer 63 at any time in series with the resistor 64. By making the time values on the scale 69 proportional to the corresponding resistance values of resistor 64 plus that part of resistor 62 connected in series therewith, the voltage across resistor 64 also becomes inversely proportional to the exposure time to which the pointer coacting with the contact 63 has been adjusted on the scale 69. Similarly the movable contact 65 is mechanically connected to a mark or pointer registering with a sliding scale 72 graduated in "Magnification" and a pointer 73 on such scale 72 registers with a stationary scale 74 graduated in "Square Inches." The graduations on the "Magnification" scale 72 are spaced in accordance with the logarithms of $$\left(\frac{M}{M \min.}\right)^2$$

where M is the magnification to which the system is adjusted and M min. the smallest possible magnification within the range of the device.

The graduations on the scale 74 are similarly spaced in accordance with the logarithms of $$\frac{A}{A \min.}$$

where A is the area of the negative or transparency to be printed and A min. the area of the smallest film negative. Accordingly, the scales 72 and 74 together with their respective pointers form a slide rule in which the horizontal distance between the origin of graduation on scale 74 and the movable pointer connected to contact 64 becomes proportional to:

$$\text{Log}\left(\frac{M}{M \min.}\right)^2 + \text{Log}\left(\frac{A}{A \min.}\right)$$

and this expression is of course a function of $M^2 \cdot A$.

Thus by designing the potentiometer so that the resistance value of its resistor 64 at every point along its length varies non-linearly and becomes respectively proportional directly to $M^2 \cdot A$, as indicated by the scales 72 and 74, instead of to the logarithmic expression, the voltage across that portion of resistor 64 between the contact 65 and the end thereof connected to resistor 62 becomes proportional to $M^2 \cdot A$.

As hereinbefore pointed out, the voltage across the entire resistance of resistor 64 is inversely proportional to the exposure time to which resistor 62 has been set by its contact 63 in accordance with the exposure time to which the scale pointer connected to contact 63 has been adjusted. The same is also true with respect to that portion of resistor 64 between its end connected to the resistor 62 and its contact 65, and this voltage is therefore proportional to $$\frac{1}{T}$$

as well as $M^2 \cdot A$, or in other words it is proportional to $$\frac{M^2 \cdot A}{T}$$

Although for sake of simplicity linear movement of certain of the density control elements have been herein shown and described it is to be understood that in the commercial embodiment of the present invention it is more feasible to replace these linear movements with rotatable mechanism, the precise position of the scales and the marks carried thereby might be shifted, and the exposure time may be accurately controlled by a timer operatively connected to the movable contact of the resistor 62.

The voltage output from this density control arrangement is supplied by a conductor 76 through a rectifier 77 to a capacitor 78 having its remaining plate connected by a conductor 79 to ground G and to the extreme end of secondary winding 68 which by a very small secondary winding 80, supplies about 1/5 volts to compensate for the small voltage loss caused by rectifier 77. The resulting D.C. voltage appearing across capacitor 78 is supplied by the conductors 76 and 79 to a balancing resistor 82, with the conductor 76 being also connected to the supply conductor for the photomultiplier tubes and thus to one end of the variable resistor 54.

The arrangement as shown in FIG. 2 also incorporates the aforesaid balance indicating circuit which, in order to indicate color balance, forms two differences between the phototube currents of two of the three light intensities as for example the "green" current minus the "red" current and the "green" current minus the "blue" current. By the utilization of a null instrument an indication is then given when these current differences become zero as a consequence of the operator manipulating the filters 8, 9 and 10 of the photographic enlarger of FIG. 1. In a similar manner a density balance is indicated when the difference between the output voltage of the density predicting circuit across conductors 76 and 79 and a voltage corresponding to the sum of all three phototube currents becomes zero as a consequence of the operator adjusting the iris diaphragm of the enlarger lens 16, or the exposure time, or both.

Although many types of devices, such as a micrometer or the like, could be employed satisfactorily as a density balance indicator, the selection of a suitable color balance indicator is considerably more difficult. This is due to the fact that such an indicator must not only indicate simultaneously when the two abovementioned voltages become zero but when there is an imbalance such color balance indicator must also visually advise the operator of the direction of the necessary filter adjustment to obtain the zero indication. The problem is aggravated further by the imperfect characteristics of even the best available color filters. These filters absorb not only the colors they are intended to absorb but also significant percentages of the two other colors, so that the adjustment of one filter almost invariably necessitates the adjustment of at least another one of such filters.

As a solution to this particular problem in accordance with the present invention, a cathode ray tube 20, as hereinbefore mentioned, is employed as a preferred type of color balance indicator. By reference again more particularly to FIG. 2 it will be noted that such cathode ray tube 20 is provided with customary heater 83, connected to any suitable source of heating energy which may be similar to that for the thermionic cathode of rectifier 42, and which heater 83 raises the thermionic cathode 58 of the cathode ray tube 20 to electron emitting temperature. A number of grids 84 focus and accelerate the electrons emitted by the thermionic cathode 58 which accordingly pass in the customary manner between the aforementioned horizontal deflection plates 56 and vertical deflection plates 55 and thus form the luminous spot 57 on a fluorescent screen 85. Also in the usual manner, the various elements of the cathode ray tube as shown are connected to suitable points of a voltage divider 86 which is supplied with a D.C. potential from a capacitor 87. Such capacitor is charged by the secondary winding 88 of a transformer 89 through a rectifier 90 and the primary winding 92 of this transformer is connected to the source of commercial supply by the main line switch 39.

The voltage differences resulting from the light intensity of the green light minus the red and the green minus the blue falling upon the photomultiplier tubes 24, 25 and 26, as obtained by adjustment of the filters 8, 9 and 10 (FIG. 1) by the operator, will accordingly appear across the points 50—52 and 52—53. Inasmuch as these points are, as previously herein mentioned, connected to the vertical deflecting plates 55 and horizontal deflecting plates 56 which are thus at right angles to each other, this voltage difference thus impressed on such plates causes a corresponding displacement of the luminous spot 57 on the fluorescent screen 85 from the center. In order to achieve proper color balance the operator then merely adjusts the color filters 8, 9 and 10 until the luminous spot 57 on the fluorescent screen 85 coincides with the center of the latter as indicated by the intersection of the vertical and horizontal lines in FIG. 1. Moreover, the direction in which the spot moves, i.e., either toward or away from the center, immediately indicates to the operator the proper direction of the filter adjustment required. Also filter imperfections are no longer a problem since they merely cause the luminous spot, upon adjustment of any given filter, to move in an angular direction relative to the vertical and horizontal rather than strictly parallel to one or the other of these lines as shown on the face of the cathode ray tube 20 is viewed in FIG. 1.

This cathode ray tube 20, as previously hereinbefore mentioned also operates as a density balance indicator simply by operation of the master switch 23. As shown in FIG. 2, such switch comprises a five-pole double-throw switch 23 in which the five contact fingers 93, 94, 95, 96 and 97 are affixed to a common shaft so that rotation thereof by a control knob on the front of the cabinet or housing 22 (FIG. 1) causes such contact fingers to engage one or the other of respective pairs of contacts. In the full line position of the switch 23 as shown in FIG. 2, it is set in its color balancing position (as also indicated by the knob pointer in FIG. 1) and in order to cause the cathode ray tube 20 to indicate density balance, the knob must be rotated in a counter-clockwise direction as viewed in FIG. 1 to the "Density" position, which thus places the contact fingers 93–97 in the dotted line position as seen in FIG. 2. When so moved to this dotted line density balance position the contact fingers 93, 94 and 95 short-circuit the respective variable resistors 35, while contact finger 96 removes the previous short-circuiting of variable resistor 54, and contact finger 97, which connected one of the horizontal deflecting plates 56 to point 53 in the color balancing position, now connects such deflecting plate to ground.

From the foregoing it should be apparent that in the color balance position of master switch 23, as shown by the full lines in FIG. 2, the voltage between points 50 and 52 is impressed upon vertical deflecting plates 55 and the voltage between points 52 and 53 is impressed upon horizontal deflecting plates 56. Moreover, these voltages represent, respectively, differences of green and blue, and of green and red, light intensities impinging on the photomultiplier tubes 24, 25 and 26 and which thus determines the currents passing through such tubes as well as through the respective variable resistors 35. When these voltages become zero by proper adjustment of the filters 8, 9 and 10, the luminous spot 57 on the screen 85 of the cathode ray tube 20 will be in the center as seen in FIG. 1 and hence all three light intensities of red, green and blue will be equal and color balance established.

In the density balance position of the master switch 23 one of the horizontal deflection plates 56 is connected by the contact finger 94 to the top of variable resistor 54, and the other horizontal deflection plate 56 is connected by the contact finger 97 to the bottom of resistor 82 and hence to ground. The voltage across variable resistor 54 is accordingly proportional to the sum of all three photomultiplier tube currents and hence proportional to the total light passing the enlarger lens 16. At the same time the voltage across resistor 82 is dependent upon the various settings of the adjustable contacts of the density predicting circuit, i.e., in accordance with negative size, magnification and exposure time, and thereby represents the correct exposure (time and intensity) which will give a satisfactory color print. It will of course be apparent that the voltages across variable resistor 54 and resistor 82 are of opposite polarity and hence the horizontal deflection plates 56 are therefore impressed with this voltage differential. When such difference becomes zero the actual light intensity passing the enlarger lens will be equal to the required light intensity as computed by the density predicting circuit and again the desired conditions for a satisfactory color print are obtained. Also such condition will become immediately apparent to the operator by the position of the luminous spot 57 in the center of the fluorescent screen 85 of the cathode ray tube 20 and again as shown in FIG. 1.

The foregoing assumes that correct color balance is obtained when the red, green and blue light intensities passing the enlarger lens are equal, or to express this somewhat differently, when all colors of a given picture integrate to a neutral grey which is frequently, but not always, true. For example, a landscape consisting of blue sky, green trees and blue water will not integrate to a neutral grey but rather to some mixture of blue and green. In instances of this kind it is desirable for the operator to adjust the color balancing circuit to compensate for this exceptional condition. This is done by changing the value of at least two of the three variable resistors 35. Inasmuch as the current passing the photomultiplier tubes 24, 25 and 26 does not change when such resistors are changed, the voltages impressed upon these resistors 35 are proportional to their respective resistances. Accordingly, if previously the luminous spot 57 of the cathode ray tube 20 was in the center of the fluorescent screen 85 when the light intensity of the red, green and blue are equal to each other, such luminous spot 57 following adjustment of at least two of the variable resistors 35 will then be in the center position when:

$$mR = G = nB$$

where $m$ and $n$ are factors (greater or less than one) which denote the magnitude of the change to which the respective variable resistors 35 were subjected. Likewise it is sometimes desirable for the operator to adjust the density balancing circuit so that prints are obtained which are purposely lighter or darker than that of the transparency density. This can be accomplished by either adjusting the value of variable resistor 54 or by varying the voltage impressed upon resistor 82 by utilization of a potentiometer or the like (not shown) connected to the latter.

A slight modification of the present invention is shown in FIG. 3 which differs from that as shown in FIG. 2 only in the amplification of the currents flowing through the photomultiplier tubes 24, 25 and 26 and the voltages impressed upon the vertical deflecting plates 55 and horizontal deflecting plates 56 of the cathode ray tube 20. Consequently, the circuitry of the modification as shown in FIG. 3 can be considered as connected to the remainder of the entire circuit arrangement at the points indicated along the lightly shaded lines A—A and B—B, respectively. As previously herein mentioned, the colorimeter assembly including the three photomultiplier tubes 24, 25 and 26 are grouped around a small integrating sphere in a known manner and as shown in FIG. 1, which is placed immediately in front of the enlarger lens 16 for the purpose of measuring the light intensities of three primary colors as a portion of the total light beam passing the film transparency 15. It is sometimes preferred, however, to measure instead the characteristics of the light beam forming but a small area of the projected image, such for example as a small grey chart placed purposely into the picture by the photographer, or part of the face of the subject in the picture, etc.

In order to do this the light distributing element or colorimeter 27 must be placed at least substantially in the plane of the projected image. Since the light intensity in such plane is only about .001 to .0001 the value of the light available under the lens, additional amplification of the current passing the photomultiplier tubes 24, 25 and 26 is necessary. To this end a pair of amplifiers 98 and 99 are provided as shown schematically in FIG. 3 and since they may be of any well known type, and hence per se form no part of the present invention, they have been shown only in block diagram. In the color balance position of the master switch 23 they amplify the voltages representing respectively the differences between green and red, and green and blue light intensities, since they are connected to the same points 50, 52 and 53 and which amplified voltage differential is then impressed upon the deflecting plates 55 and 56 of cathode ray tube 20 in the same manner as previously described relative to FIG. 2.

Inasmuch as the luminous spot 57, as previously mentioned, will be in the center of the fluorescent screen 85 when the voltage differentials become zero, the amplification factors of these amplifiers 98 and 99 need not be very accurate and no compensation for drift due to temperature changes or other causes is necessary. Any changes in amplifier characteristics tending to give an unbalanced condition will merely cause said luminous spot 57 to be a little closer or a little more remote from the center of the screen 85 but will otherwise be of no influence upon the accuracy of the color balance adjustment. In the density balance position of the master switch 23 the amplifier 99 will amplify the difference between the voltages impressed respectively upon variable resistor 54 and resistor 82 and again any changes in amplifier characteristics will not affect the final result. Moreover, in this modification of the present invention as shown in FIG. 3 and when used as above described, no allowance need be made for negative size or magnification and contactor 65 may therefore be left in a predetermined fixed position.

The exposure control device of the present invention and as previously herein described is operable by the operator first placing a film transparency or negative 15 on the film stage of the enlarger and then adjusts the magnification and sharpness of the projected image in the usual manner by movement of the bellows supported enlarging lens 16. The density predicting circuit is then adjusted in accordance with the negative size, or more accurately with the aperture of the film or transparency holder, the desired magnification and a selected exposure time, using the scales 69, 72 and 74 as shown in FIG. 2. Next the colorimeter assembly 27 is placed either beneath the enlarger lens 16 as shown in FIG. 1, or in a selected area in the plane of the projected image, depending upon whether the exposure control device is made in accordance with FIG. 2 or the modification of FIG. 3. The master switch 23 is then moved to its color balance position as shown in FIG. 1 and by the full lines in FIGS. 2 and 3, and if for any reason the negative 15 is other than one of average color and density characteristics at least two of the variable resistors 35 ("blue" and "red") will be first adjusted. Next the filters 8, 9 and 10 of the photographic enlarger are adjusted either by the operator turning the knobs 12 (FIG. 1), or by operation of reversible motors as shown and described in the aforesaid copending application, Serial No. 3,033, filed January 18, 1960, until the luminous spot 57 is in the center of the fluorescent screen 85 of the cathode ray tube 20 as seen in FIG. 1. Having thus set the device to produce a preselected color balance the master switch 23 is then moved to the "Density" balance position shown in FIG. 1 and corresponding to the dotted line position indicated in FIG. 2, and the iris diaphragm of the lens 16, and if necessary also the setting of the timer, is adjusted until the luminous spot 57 is again in the center of the fluorescent screen 85 of the cathode ray tube 20. The entire device is then ready for the making of a photographic color print on the sensitized paper 17 in the usual manner.

It should thus become obvious to those skilled in the art that an exposure control device for color prints is herein provided wherein the photographic enlarger is preset to produce color prints of desired color balance and overall density, by the operator first obtaining a visual observation on an indicator when the device is properly set to achieve desired color balance, and such device is then set to operate so that the same indicator gives the operator a visual observation that the photographic enlarger is then preset to produce proper overall density balance of a finished color print.

Although several specific embodiments of the present invention have been shown and described it is to be understood that still further modifications thereof may be made without departing from the spirit and scope of the appended claims.

I claim:
1. An exposure control device for photographic printers and enlargers comprising a plurality of color filters each one of which is adjustable to control the intensity of light of one of the primary colors in a light beam passing through a film transparency and impinging upon sensitized paper during the making of a print, said exposure control light device comprising means operable to measure the intensities of several differently color components of the light beam of said photographic enlarger including photosensitive tubes respectively operable to pass currents proportional to the intensities of each color component in the light beam impinging thereon, voltage generating means connected to said photosensitive tubes and operable in response to the passage of current therethrough to produce voltages proportional to such respective current values, and said voltage generating means being normally operable in response to the initial setting of the color filters of said photographic enlarger to cause a voltage differential between a first and second of said proportional voltages and between the first and a third of said proportional voltages respectively, and indicator means connected to said voltage generating means and operable to give a visual indication as to when said voltage differentials become zero in response to adjustment of the color filters of said photographic enlarger from their initial setting.

2. An exposure control device for photographic printers and enlargers as set forth in claim 1 in which said indicator means comprises a cathode ray tube having one pair of its deflecting plates connected to one of said differential voltages and its other pair of deflecting plates connected to the other of said differential voltages, whereby the luminous spot on the screen of said cathode ray tube is normally deflected from the center thereof to a degree depending upon the difference between said differential voltages in the initial position of the color filters of said photographic printer, and with said luminous spot being movable into the center of the cathode ray tube screen upon said voltage differentials becoming zero by adjustment of said color filters from their initial setting.

3. An exposure control device for photographic printers and enlargers comprising a plurality of color filters each one of which is adjustable to control the intensity of light of one of the primary colors in a light beam passing through a film transparency and impinging upon sensitized paper during the making of a print, said exposure control device comprising a voltage supply source, three photosensitive tubes adapted to be respectively exposed to different color components of the light beam of said photographic enlarger and each said photosensitive tube having a positive and negative terminal with all terminals of one sign connected to one side of said voltage supply source and all terminals of the other sign connected to a respective junction point, a plurality of resistors having one of their respective ends connected together and to the other side of said voltage supply source and the remaining end thereof connected to a respective one of said junction points whereby each one of said resistors is thus in series with a respective one of said photosensitive tubes across said voltage supply source, a cathode ray tube connected to a suitable source of supply for causing the formation of a luminous spot on the fluorescent screen thereof, and connections from one pair of deflecting plates of said cathode ray tube to one set of two of said junction points and from the other pair of deflecting plates of said cathode ray tube to a different set of two of said junction points to cause deflection of the luminous spot on the fluorescent screen of said cathode ray tube when a voltage differential occurs between said sets of two junction points.

4. An exposure control device for photographic printers and enlargers as set forth in claim 3 wherein voltage limiting means is connected in electrical parallel with each respective resistor and operable to limit the voltage to a value which restricts the degree of deflection of the luminous spot to the confines of the fluorescent screen of said cathode ray tube.

5. An exposure control device for photographic printers and enlargers as set forth in claim 3 wherein a voltage limiting gaseous discharge tube is connected in electrical parallel with each respective resistor and operable to limit the voltage to a value which restricts the degree of deflection of the luminous spot to the confines of the fluorescent screen of said cathode ray tube and also indicates the direction of such deflection whether toward or away from the center of such screen.

6. An exposure control device for photographic printers and enlargers comprising a plurality of color filters each one of which is adjustable to control the intensity of one of the primary colors in a light beam passing through a film transparency and impinging upon sensitized paper during the making of a print, said exposure control device comprising a light measuring circuit including photosensitive tubes subjected to the intensities of several differently colored components of the light beam of said photographic enlarger and each said photosensitive tube being respectively operable to pass a current proportional to the intensity of a component of one of the respective primary colors in the light beam, voltage generating means in said circuit and operable in response to the passage of current through said respective photosensitive tubes to produce a voltage proportional to the sum of all the currents passed by all said photosensitive tubes; a density predicting circuit including a voltage source adjustable by an operator in accordance with preselected values of exposure time, magnification and film area to generate a voltage proportional to the light required to produce a desired print density, junction points common to both said light measuring circuit and said density predicting circuit having a voltage thereacross representing the difference between the voltages as produced by each said circuits; and a balance indicating circuit including an indicator connected to said junction points and operable to visually indicate the differential voltage between said light measuring circuit and said density predicting circuit and for giving a visual indication to an operator when such voltage differential becomes zero upon adjustment of the iris diaphragm of said photographic enlarger, the adjustment of exposure timer, or both.

7. An exposure control device for photographic printers and enlargers as set forth in claim 6 wherein the density predicting circuit comprises an adjustable rheostat having a movable pointer adapted to be preset in accordance with a selected exposure time and a potentiometer provided with an adjustable contact adapted to be preset in accordance with the area of the film transparency and the square of the magnification, a source of input voltage connected to one end of said potentiometer and to the movable pointer of said rheostat and the remaining end of said potentiometer being connected to one end of said rheostat, and output conductors connecting one end of said potentiometer and its adjustable contact to the said junction points in said light measuring circuit.

8. An exposure control device for photographic printers and enlargers as set forth in claim 6 wherein the indicator in said balance indicating circuit comprises a cathode ray tube having a pair of its deflecting plates connected to said junction points and thus across the differential voltage impressed thereon with attendant deflection of the luminous spot from the center of the fluorescent screen of said cathode ray tube and which luminous spot automatically returns to the center of said fluorescent screen upon the differential voltage becoming zero following adjustment by the operator of the iris diaphragm of said photographic enlarger, readjustment of the exposure timer, or both.

9. An exposure control device for photographic printers and enlargers comprising a plurality of color filters each one of which is adjustable to control the intensity of light of one of the primary colors in a light beam passing through a film transparency and impinging upon sensitized paper during the making of a print, said exposure control device comprising a light measuring circuit including a voltage supply source, three photosensitive tubes adapted to be respectively exposed to different color components of the light beam of said photographic enlarger and each said photosensitive tube having a positive and negative terminal with all terminals of one sign connected to one side of said voltage supply source and all terminals of the other sign connected to a respective junction point, a plurality of resistors having one of their respective ends connected together and to the other side of said voltage supply source and the remaining end thereof connected to a respective one of said junction points whereby each one of said resistors is thus in series with a respective one of said photosensitive tubes across said voltage supply source, a line resistor connected to said voltage supply source and in series with all of said photosensitive tubes and their respective associated resistors; a density predicting circuit including a voltage source adjustable by an operator in accordance with preselected values of exposure time, magnification and film area to generate a voltage proportional to the light required to produce a desired print density, a balancing resistor across the output of said density predicting circuit and one side of said output being connected to one side of the voltage supply source of said light measuring circuit to cause the voltage across said balancing resistor and the series connected line resistor of said light measuring circuit to be of opposite polarity, and a balance indicating circuit including a cathode ray tube having a pair of its deflecting plates connected across the series connection of said line resistor of said light measuring circuit and the balancing resistor of said density predicting circuit whereby the voltage differential between said two resistors causes the luminous spot on the fluorescent screen of said cathode ray tube to be deflected from the center thereof to a degree dependent upon the magnitude of such voltage differential.

10. An exposure control device for photographic printers and enlargers comprising a plurality of color filters each one of which is adjustable to control the intensity of one of the primary colors in a light beam passing through a film transparency and impinging upon sensitized paper during the making of a print, said exposure control device comprising a light measuring circuit including photosensitive tubes subject to the intensities of several differently colored components of the light beam of said photographic enlarger and each said photosensitive tube being operable to pass a current proportional to the intensity of a component of one of the respective primary colors in the light beam, voltage generating means in said circuit and operable in response to the passage of current through said respective photosensitive tubes to produce a voltage proportional to each respective current value and also operable to produce a voltage proportional to the sum of all currents passed by all said photosensitive tubes, said voltage generating means being normally operable in response to the initial setting of the color filters of said photographic enlarger to cause a voltage differential between a first and second of said proportional voltages and between the first and third of said proportional voltages respectively; a density predicting circuit including a voltage source adjustable by an operator in accordance with preselected values of exposure time, magnification and film area to generate a voltage proportional to the light required to produce a desired print density, junction points common to both said light measuring circuit and said density predicting circut having a voltage thereacross representing the differential between the voltage produced by said light measuring circuit proportional to the sum of the currents passed by all said photosensitive tubes and the voltage produced by said density predicting circuit; a balance indicating circuit including visual indicator means operable under one condition to give an indication of the existence of a voltage dfferential and under another condition that such voltage differential has become zero, and means operable by an operator to subject said indicating means to the voltage differentials of said light measuring circuit to indicate when said differentials become zero in response to the adjustment of the color filters of said photographic enlarger from their initial setting, and said means being further operable by the operator to subject said indicating means to the voltage differential between the voltage produced by said light measuring circuit in response to the sum of the current of all said photosensitive tubes and said density predicting circuit to cause said indicating means to give a visual indication as to when this last mentioned voltage differential becomes zero in response to the adjustment of the iris diaphragm of said photographic enlarger, the exposure timer, or both.

11. An exposure control device for photographic printers and enlargers as set forth in claim 10 wherein the indicating means in the balance indicating circuit comprises a cathode ray tube having one pair of its deflecting plates subjected to the voltage differential between the first and second proportional voltages and its other pair of deflecting plates subjected to the first and third voltage differential as produced by said light measuring circuit under one condition of operation of said last mentioned means, and one of the pairs of deflecting plates of said cathode ray tube being subjected to the voltage differential between the voltage produced by said light measuring circuit proportional to the sum of the current passed by all of said photosensitive tubes and the voltage produced by said density predicting circuit under another condition of operation of said last mentioned means.

12. An exposure control device for photographic printers and enlargers as set forth in claim 10 wherein the indicator in the balance indicating circuit comprises a cathode ray tube and the last mentioned means comprises a multipole double-throw switch operable in one position to connect one pair of deflecting plates of said cathode ray tube to the first and second proportional voltages and to connect its other pair of deflecting plates to the first and third proportional voltages as produced by said light measuring circuit to cause the luminous spot on the fluorescent screen of said cathode ray tube to be deflected to the center thereof when the differential between said voltages become zero in response to the adjustment of the color filters of said photographic enlarger, and said switch being operable in its other position to connect one pair of the deflecting plates of said cathode ray tube to said junction points common to both said light measuring circuit and said density predicting circuit to cause the luminous spot on the fluorescent screen of said cathode ray tube to again be deflected to the center thereof when the voltage differential across said junction points becomes zero in response to the adjustment of the iris diaphragm of said photographic enlarger, the readjustment of said exposure timer, or both.

References Cited in the file of this patent

UNITED STATES PATENTS

| | | |
|---|---|---|
| 2,528,977 | Simmon | Nov. 7, 1950 |
| 2,544,196 | Varden | Mar. 6, 1951 |
| 2,757,571 | Loughren | Aug. 7, 1956 |
| 2,844,988 | Lize et al. | July 29, 1958 |